(12) United States Patent
Lyman

(10) Patent No.: US 10,167,980 B2
(45) Date of Patent: Jan. 1, 2019

(54) TRAY BRACKET FOR MOUNTING ELECTRICAL COMPONENTS

(71) Applicant: Emitter Energy, Inc., Raleigh, NC (US)

(72) Inventor: Seepersad Lyman, Raleigh, NC (US)

(73) Assignee: EMITTER ENERGY, INC., Raleigh, NC (US)

( * ) Notice: Subject to any disclaimer, the term of this patent is extended or adjusted under 35 U.S.C. 154(b) by 0 days.

(21) Appl. No.: 15/256,512

(22) Filed: Sep. 3, 2016

(65) Prior Publication Data
US 2018/0195704 A1 Jul. 12, 2018

(51) Int. Cl.
*H02G 3/08* (2006.01)
*F16L 3/223* (2006.01)
*F16M 13/02* (2006.01)
*H05B 33/08* (2006.01)

(52) U.S. Cl.
CPC ............ *F16L 3/223* (2013.01); *F16M 13/02* (2013.01); *H05B 33/08* (2013.01)

(58) Field of Classification Search
CPC .......... F16M 13/02; F16L 3/223; H05B 33/08
USPC ...................................... 248/906; 174/50, 56
See application file for complete search history.

(56) References Cited

U.S. PATENT DOCUMENTS

| 7,075,005 | B1* | 7/2006 | Drane | H02G 3/185 |
| | | | | 174/50 |
| 7,132,601 | B1* | 11/2006 | Seff | H02G 3/088 |
| | | | | 174/481 |
| 7,525,042 | B2* | 4/2009 | Lazzaro | H02G 3/086 |
| | | | | 174/135 |
| 7,604,446 | B2* | 10/2009 | Fonti | F16B 5/02 |
| | | | | 174/58 |
| 9,035,175 | B2* | 5/2015 | Korcz | H02G 3/086 |
| | | | | 174/50 |
| D756,750 | S * | 5/2016 | Vrame | D8/354 |
| 9,568,123 | B2* | 2/2017 | Zhang | H02G 3/081 |
| 9,667,050 | B1* | 5/2017 | Vrame | H02G 3/22 |
| 2007/0057132 | A1* | 3/2007 | Case | H02G 3/123 |
| | | | | 248/300 |

* cited by examiner

*Primary Examiner* — Gwendolyn W Baxter

(57) ABSTRACT

An assembly for securely mounting and housing electrical power components. The assembly includes a tray-type mounting bracket for mounting and holding electrical equipments, specifically for an LED driver to a luminaire. The mounting bracket consists of tray-type bracket, at least two integral wiring compartments, one on each end of the mounting bracket, and at least two mechanically secured lid covers for securely covering any wiring. The tray-type mounting bracket includes a center part which is open to the surrounding environment for cooling the LED driver.

11 Claims, 4 Drawing Sheets

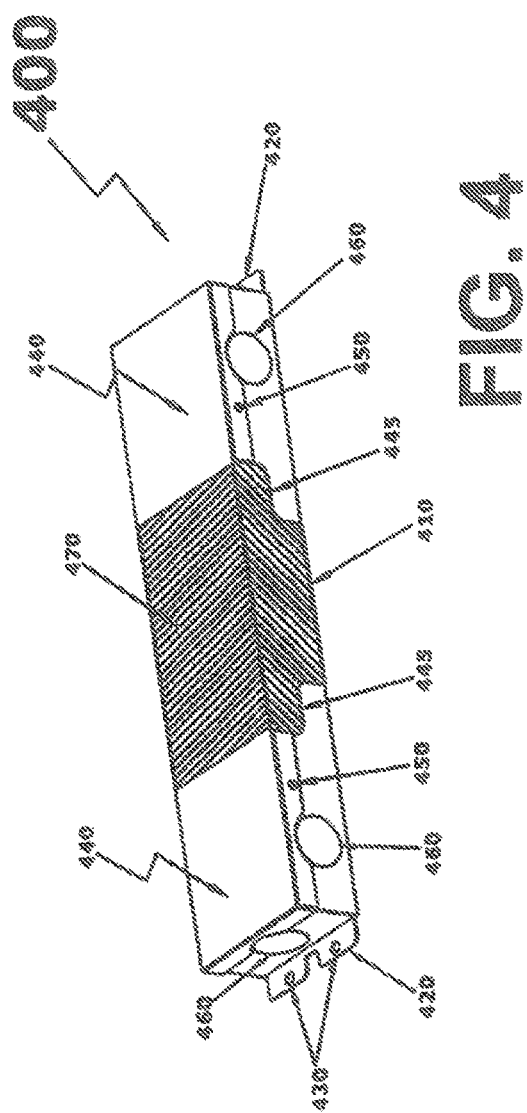

TRAY BRACKET FOR MOUNTING ELECTRICAL COMPONENTS

FIELD OF THE INVENTION

The present invention relates generally to the construction of a mounting bracket for housing electrical power components and, more particularly, to a tray-type mounting bracket platform for housing power supplies, LED drivers and other electrical components.

BACKGROUND

Due to most users of lighting fixtures becoming energy-saving conscious, as well as an increase in energy regulations, LEDs or light-emitting diodes is increasing in Demand. LEDs are designed to operate using a low voltage direct current and alternating current. When direct current types are used an LED driver must be used to convert the input alternating current to output direct current.

Because of the aforementioned issue of supplying low-rated voltage and the required direct current, it is necessary to include an LED driver, also known as an LED power supply with LED light fixture. LED drivers rectify higher voltages (120V) alternating currents into a lower voltage direct current. LED drivers come in two types: (a) an internal LED driver incorporated into the LED bulb; internal LED drivers are common in household bulbs, and (b) an external LED driver, as the name indicates, is not incorporated into the LED bulb or a bank of LED bulbs. External LED drivers are common with LEDs, such as, downlights, tape lights, cove lights, and general illumination fixtures for indoor and outdoor applications.

In recent years, the use of LED's has become prevalent in today's society, and are used in residential, industrial and commercial applications. It has been ascertained that external LED driver's life expectancy are reduced as a result of high internal operating temperatures. To circumvent such a problem, designers of LED drivers often include a heat sink to dissipate excess heat and prolong the life of the LED.

In addition to incorporating a heatsink, still there is a need in the industry for additional ways to remove such excess heat that is being generated by today's LED drivers.

SUMMARY OF THE INVENTION

The present invention relates to a bracket for mounting high-output LED drivers units, and other power supplies used in existing light fixtures, such as, for example, shoe-box parking lot fixtures, canopy fixtures, street light fixtures, flat panel fixtures, recessed and surface mounted types of fixtures. Specifically, the bracket is adjustable to fit fixture housings for different sizes and number LED drivers.

A first embodiment the present invention provides an apparatus incorporated in three parts, a main bracket for housing an LED driver; the main bracket includes an uncovered area open to the ambient surroundings that houses the LED driver, and two end areas for housing incoming and outgoing wiring splice connections. The two end areas include covers for enclosing the splice connections.

The embodiment may further provide different sizes and wattages for accommodating different rated LED drivers from any manufacturer.

Moreover, it is an advantage and objective of the present invention to provide apparatuses, systems and methods for effectively and safely house LED drivers and facilitate the reduction of generated heat by the LED driver components in order to prolong the life and efficiency of LED drivers and lighting fixtures.

Additional features and advantages of the present invention are described in, and will be apparent from, the detailed description of the presently preferred embodiments and from the drawings.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 4 is a top view of LED mounting bracket with the lid covers and the LED driver unit in place according to an embodiment of the invention.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention is a mounting bracket for an LED driver, which is used to attach the mounting bracket to the fixture housing. The mounting bracket includes a base plate that has a front face with an opening for receiving integral splice/wiring for the LED driver and a plurality of holes for securing the LED driver to the mounting bracket using screws or other fastening means.

Figure 1:
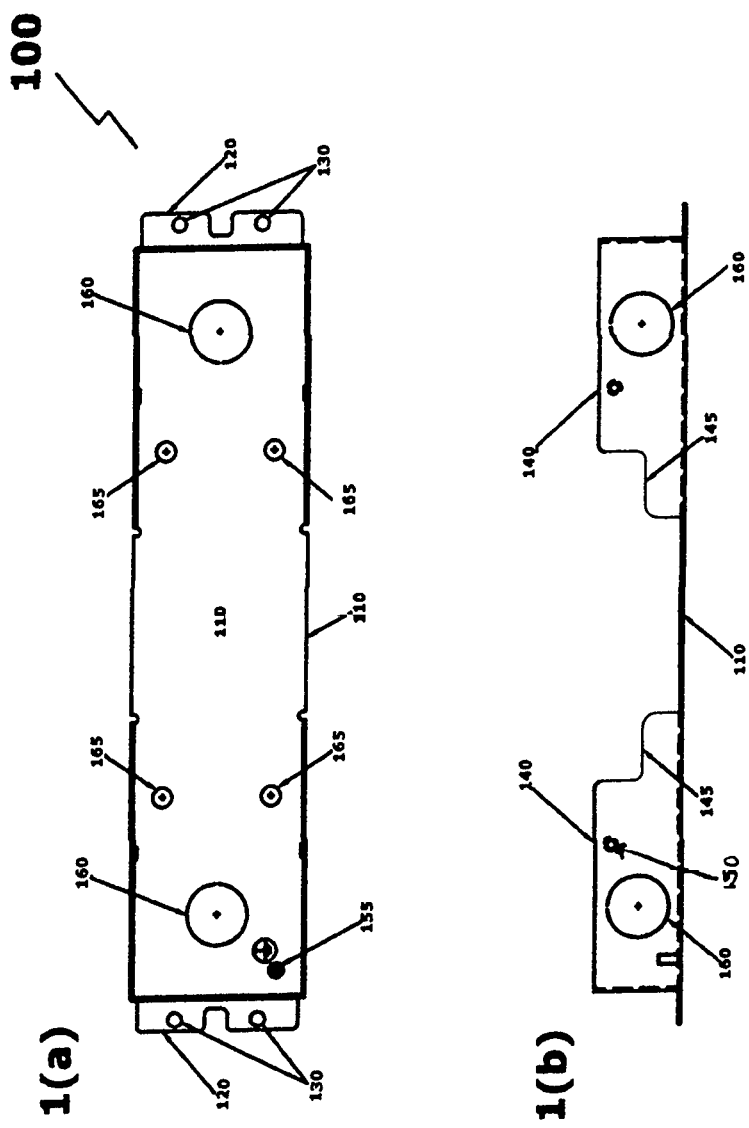
FIG. 1(a) is a top view of the LED mounting bracket according to an embodiment of the present invention.
FIG. 1(b) is a side view of the LED mounting bracket according to an embodiment of the present invention

In one embodiment and in reference to FIG. 1(a) and (b). FIG. 1(a) shows a bottom perspective view of a first embodiment of the mounting bracket 100 used for an LED driver 470 (see FIG. 4). The mounting bracket 100 includes a substantially planar base plate 110 with a number of holes 130, on mounting feet 120 each side of the mounting bracket 100 for securing it to the fixture housing (not shown). For safely securing the mounting bracket 100 to the fixture housing, either side of the mounting bracket 100 may be securely mounted by screwing four or more screws. FIG. 1(a) is a bottom perspective view of the mounting bracket 100, and includes four ½, ¾ or 1 inch trade size conduit knockouts 160, on each side of the mounting bracket 100, allowing sufficient clearance for securement of a conduit nut (not shown) as required by UL 1598 standard for luminaires. Conduit connection is a requirement by Article 725 of the NEC as well as the UL standard 1598. Additionally, the mounting bracket 100, includes a grounding stud 155 constructed from zinc plated steel, and is provided in the corner of an integral splice/wiring compartment, where the input branch wiring connections are made. In another variation, only one wiring/splice compartment is formed at one end of the mounting bracket. Per the standard for luminaires, and article 725 of the NEC as well as UL standard 1598, it is required that lighting luminaires be provided with means for connecting branch circuit ground, as such, the grounding stud 155, of the present invention is provided with the mounting bracket 100. I addition, the end piece of the wiring/splice compartment includes a boss for securement of a ground screw located on one of the two wiring/splice compartments.

Figure 2:
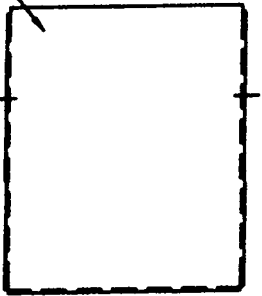
FIG. 2(a) is a top view of the lid cover for the mounting bracket according to an embodiment of the present invention.
FIG. 2(b) is a side view of the lid cover for the mounting bracket according to an embodiment of the present invention.
Figure 2:
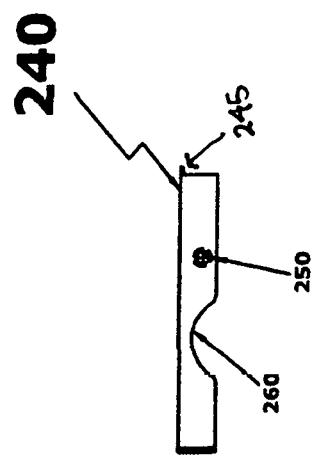

For example, FIG. 1(a) shows perspective view of a first embodiment of the mounting bracket 100 used for an LED driver 470 (see FIG. 4). And further includes four LED driver mounting holes 165, for securing the LED driver 470. The four LED driver mounting holes 165 two on each side, are positioned in a cutout between two wiring compartments, one on each side of the mounting bracket 100. These mounting holes are specifically designed to match the mounting holes found on the enclosure case of LED driver packages. The four LED driver mounting holes 165 of the mounting bracket 100 of the present invention mechanically secure the LED driver case to luminaire housing; and mounting 120 are provided on each end of the mounting bracket 100, with integral holes for securement of the mounting bracket 100 to a luminaire or other mounting surface. FIG. 1(b) is a perspective side view of the mounting bracket. In this view, the additional element included in this view is a tapered hole 150, on each side (4 in all) of the mounting bracket 100, for securing the lids (see FIG. 2).

In a further embodiment of the present invention, and in reference to FIGS. 2(a) and 2(b), there shown a perspective side view (FIG. 2(b)), a lid cover 200 for covering the integral splice/wiring compartment. The lid covers 200, are constructed from a galvanized steel, 0.8 mm thick, it includes a top part 240, an overlapping lip 245 that covers the outside of the mounting bracket 100, and is mechanically secured by two or more screws driven through a tapered hole 250. The lid covers 200, further include a curvature 260, for accommodating to fit along the knockouts 160 (See FIG. 1(b)) of the main portion of the mounting bracket 100.

Figure 3:
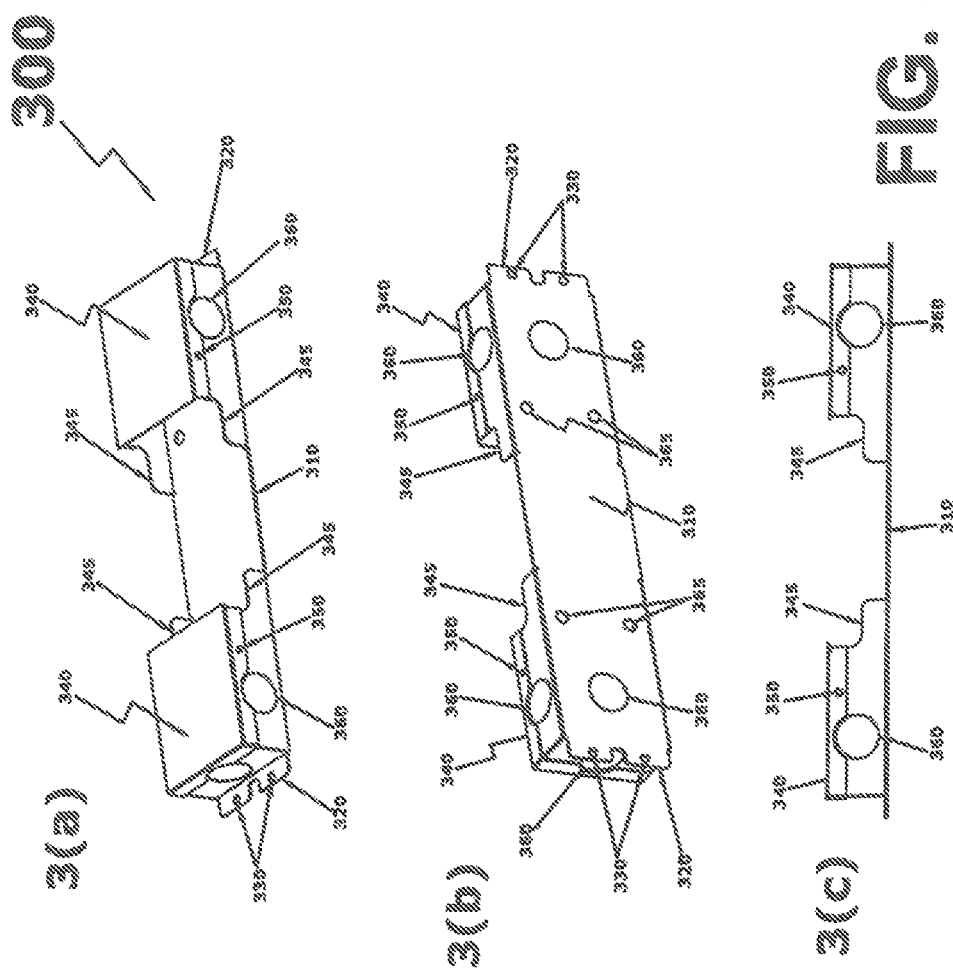
FIG. 3(a) is a top view of LED mounting bracket with the lid covers in place according to an embodiment of the invention.
FIG. 3(b) is a bottom view of LED mounting bracket with the lid covers in place according to an embodiment of the invention.
FIG. 3(c) is a side view of LED mounting bracket with the lid covers in place according to an embodiment of the invention.

FIGS. 3(a), (b) and (c) are top, bottom and side perspective views of the mounting bracket 300, with the lid covers 340 that cover the integral splice/wiring on each side of the mounting bracket 300. In regard to FIGS. 3(a)-(c), all numerical notations are alike. Hence, FIG. 3(b) being the one showing most of the features of the present invention, the different features are shown and explained here. A bottom perspective view of a first embodiment of the mounting bracket 300 shown is used for an LED driver 470 (see FIG. 4). The mounting bracket 300 includes a substantially planar base plate 310 with a number of holes 365 for safely securing the mounting bracket 300 to a fixture housing. Mounting feet 320 on each side of the mounting bracket 300 also includes mounting feet holes 330 for securing it to a fixture housing (not shown). Included is an overlapping lip 345 that covers the outside of the mounting bracket 300. Furthermore, integrated into the mounting bracket 300, are lid covers 340, found on each side of the mounting bracket 300, for covering an integral splice/wiring compartment. The lid covers 340 are constructed from galvanized steel, 0.8 mm thick, and are mechanically secured by two or more screws driven through tapered holes 350.

In yet another embodiment of the present invention, and in reference to FIG. 4, there shown is a complete structure of the mounting bracket 400, including two lid covers 440, for covering the integral splice/wiring compartment that houses the LED driver wiring, a minimum of eight conduit knockouts 460, that provide a minimum clearance around a conduit opening flat surface for securing of a conduit fitting nut as required by UL standard 1598 for luminaires. Lid covers 440, which are constructed from a galvanized steel, 0.8 mm thick, and includes a top part 440, an overlapping lip 445 that covers the outside of the mounting bracket 400, and is mechanically secured by two or more screws driven through a tapered hole 450. The mounting bracket further includes a base plate 410, with an extension 420, on each side of the mounting bracket 400, that include a number of holes 430, for securely mounting the bracket 400 on a wall or any other structure. In addition, it is shown in FIG. 4, an LED driver case 470 (shaded area) incorporated into the mounting bracket 400.

It will be appreciated by one of skill in the art that mounting brackets that LED mounting bracket of the present invention may be set up to safely and securely hold various size of LED driver cases and wattages.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A mounting bracket for an LED driver comprising:
a base plate having substantially planar bottom surface, and having mounting feet on each side,
with a plurality of mounting screw apertures on the base plate;
a plurality of mounting screw apertures on an extension plates;
the center portion of the mounting bracket between an integral wiring compartments is opened allowing exposure to a surrounding ambient air;
one or more integral wiring compartments on each side of the mounting bracket;
one or more lid covers, for securely protecting wiring placed in the integral wiring compartments, and including one or more tapered holes;
a plurality of conduit knockouts on the sides, front, back and bottom of the mounting bracket;

said mounting feet are on each end of the mounting bracket with integral holes for securement of the mounting bracket to a luminaire or other mounting surface, and an opening for receiving an LED driver case.

2. The apparatus of claim 1 further wherein the mounting feet include one more holes for receiving screws for affixing the mounting bracket.

3. The apparatus of claim 1 wherein the mounting screw apertures on the base plate receives screws for fastening the LED driver case to the mounting bracket.

4. The apparatus of claim 1, wherein the one or more lid covers includes an outside overlapping lip for mechanically securing said one or more lid covers.

5. The apparatus of claim 1, wherein the tapered holes receive screws for securing the lid covers.

6. The apparatus of claim 1 wherein the mounting bracket includes two wiring splice compartment enclosures are formed at each of the end of the mounting bracket.

7. The apparatus of claim 1 wherein the mounting bracket includes only one wiring splice compartment enclosure is formed at one end of the mounting bracket.

8. The apparatus of claim 6 or 7, wherein a boss for securing a ground screw located on the one of the two wiring splice compartments.

9. The apparatus of claim 1, wherein the conduit knockouts ½, ¾ or 1 inch trade size.

10. The apparatus of claim 9, wherein the conduit knockouts facilitate securement of conduit fitting nuts.

11. The apparatus of claim 1, wherein the center is opened allowing the LED driver case to be exposed to the surrounding ambient air for decreasing the operating temperature of the LED driver and extend the life of the LED driver.

* * * * *